Patented Nov. 25, 1947

2,431,498

UNITED STATES PATENT OFFICE 2,431,498

SHORTENING

Gerald C. North, Alvin J. Alton, and Lawrence Little, Chicago, Ill., assignors to Beatrice Creamery Company, Chicago, Ill., a corporation of Delaware No Drawing. Application January 14, 1946, Serial No. 641,170

1 Claim. (Cl. 99—123)

This invention relates to a roll dried granular shortening composition comprising a fat core having a protective hull of milk solids for use in the making of bread, rolls and similar bakery goods. By roll dried is meant dehydration of a fluid containing the shortening dispersed therein by evaporation of the moisture on conventional revolving drums and removing the dried product by suitable fixed blades. The term "roll dried" also includes equivalent drying processes notably tray drying, but does not comprehend dehydration by atomization or spray drying. The roll dried product can be readily distinguished, for example, from a spray dried product, by its granular form, flavor and solubility in water.

The dry powdered shortenings prepared by this invention are non-greasy, free flowing, and readily water dispersable compositions of finely divided discrete particles of an edible fat each provided with a coating or hull of milk solids or soya bean solids or mixtures thereof.

The primary object of the invention is to provide a granular shortening composition which, although prepared by drying at temperatures of about 250° F. to 400° F. has a high free fat content. That is to say, when the shortening is dispersed in a dough, the maximum amount of fat is freed and made available to exert the shortening function.

An equally important object of the invention is to provide a granular shortening composition wherein the hull of milk solids has markedly improved characteristics, in that it is readily ruptured and dissolved to thereby rapidly and completely free the enclosed fat and render the shortening immediately and efficiently active.

Another object of the invention is to provide a granular shortening composition, the milk solids in which provide water absorptivity comparable to a substantially equal amount of roll dried skim milk powder, the composition being particularly useful in the making of bakery products from raised yeast dough.

A further object of the invention is to provide a granular shortening composition which is free flowing and non-greasy to the touch, whereby the product may be packaged and stored as a dry powder.

An additional object of the invention is to provide a shortening composition containing an agent which permits drying at high temperature without objectionable oiling off on the surface of the drying rolls and in the dried product promotes solubility in water of the relatively insoluble dry milk solids.

Also, it is an object of the invention to provide a shortening composition containing a hydrophilic agent which facilitates the formation of films of maximum thickness on the drying drums, thereby contributing to uniform drying and increasing the capacity of the drier. Also, in addition to imparting enhanced water absorptivity to the shortening, the hydrophilic agent is widely dispersed thereby throughout the baked product. The hydrophilic agent therefore facilitates moisture retention in the baked goods for an increased period of time.

In carrying out the invention, a suitable edible shortening oil or fat is employed. The edible fats or oils may be liquid materials, semi-solid materials or those which are solid at room temperature, either natural or chemically produced such as by hydrogenation. The oils may be cottonseed oil, corn oil, peanut oil, sunflower or other edible oils; the semi-solid fats may be lard, butter, margarine or the like; the solid fats may be animal fats or they may be the liquid oils previously mentioned which have been hydrogenated. Or they may be hydrogenated soybean oil, hydrogenated fish oil, sperm oil or the like; in addition, the fats may be composed of any combination of the oils, semi-solids or solid fats. Other shortening materials than those recited may be used.

The oil or fat is dispersed in a milk solids product such as skim milk, whey, buttermilk, cream, normal milk, vegetable milk, e. g., derived from soya bean, and mixtures of the same, and an emulsion produced. Such liquid products may be of normal moisture content or are preferably suitably condensed. Other products than those mentioned may be used to form the protective hull of solids about the fat core of the granular shortening.

The proportions of fat and milk solids may be varied so as to supply the desired amount of each of these ingredients. A preferred range is between about 30 to 40 per cent fat and about 70 to 60 per cent milk solids.

I have found that within the above limits, the drying of the emulsion on roll dryers at temperatures between 250° F. and 400° F. can be successfully carried out without oiling off. In order to prevent oiling off in some cases, there is included an emulsifying hydrophilic agent which, at the roll drying temperatures recited, prevents the breaking of the emulsion. Suitable agents to eliminate oiling off are lecithin, derived from vegetable sources, eggs or milk, and glycerides, such as the monoglycerides. Other agents than those described may be employed. About 0.2 to 1.5 per cent of such an agent based on the weight of the final product will usually be sufficient. Where buttermilk or soya bean solids are employed, the emulsifying agent may be omitted or used in less amount.

In order to improve the film forming properties of the emulsion as well as to increase water absorptiveness in the shortening and in the final baked goods, a hydrophilic agent may be employed with or in the absence of the emulsifying agent, as, for example, Irish moss, alginates, salts of Algin, agar-agar, gum acacia, gum arabic, gum tragacanth or like materials which tend to swell in the presence of moisture. Other agents than here described may be utilized. Such hydrophilic agent is used in amount of about 0.1 to 0.6 per cent based on the dry weight of the product.

If desired, sugar and salt may be included in the shortening emulsion in appropriate amounts.

The roll drying of an emulsion of fat and milk solids in the proportions above recited and at a temperature of about 250° F. to 400° F. will produce a dry granular shortening characterized by a high percentage of free fat, as measured by "extraction with petroleum ether," e. g. about 45 to 50 percent and improved water absorptiveness, the powdered shortening being free flowing and devoid of greasiness.

The free fat is appreciably increased by the inclusion of the hydrophilic emulsifying agent alone and is further increased by the use of both the emulsifying agent and the hydrophilic colloidal material up to as high as about 90 per cent as measured by "extraction with petroleum ether."

There is not, to our knowledge, any standard test for determining the amount of free fat in a shortening compound of the character described herein, nor can this be determined in the baking operation other than by noting the properties of the final baked product. Moreover, there is no way to accurately determine the rupturability of the protective hull. We have therefore devised a test for the purpose of which we term "extraction with petroleum ether." By this term in the specification and claims is meant the following test whereby the amount of free available fat in the shortening with reference to the amount of fat initially added in making up the composition is determined:

100 cc. petroleum ether is added to 10 grams of shortening powder in an Erlenmeyer flask and shaken ten times. The petroleum ether is allowed to settle 15 minutes and the clear portion of the ether poured into a previously weighed dish and evaporated. A second extraction is then made in the same manner and the ether extract again evaporated. The amount of fat is determined by the weight of the combined residues from the two extractions in the said dish. This is then calculated with respect to the amount of fat initially added to make up the composition for determining the amount of free fat.

Example I

An emulsion is prepared from 2000 pounds of 30 per cent condensed skim milk, 300 pounds of shortening fat, nine pounds of vegetable lecithin and two pounds of ammonium alginate. Other ingredients may be included in the emulsion. The emulsion is preferably but not necessarily homogenized or treated in a colloid mill and then in suitably heated condition of about 150 to 160° F. is introduced to the drying drums. The latter have a temperature of about 250° F. to 400° F. and the dehydrated product is scraped from the rolls by stationary knives and suitably collected and reduced to granular form.

The heating of the condensed skim milk by the drums develops anti-oxidant principles in the product due apparently to the presence of residual amounts of the mother substance from which such beneficial principles are derived. The granular material has a high free fat content, enhanced water absorptiveness, is free flowing and is devoid of greasiness.

The emulsifying agent assists the drying by retarding any tendency to oil off, making it possible to dry a higher percentage of fat particularly in cases where previous homogenization or colloidal mill treatment is not used. Moreover, the emulsifying agent is present in amount active to render the water absorptive hull of milk solids more soluble in water, being thus a solubility promoting agent, and increases the resistance of the shortening to rancidity.

The hydrophilic agent increases the basic viscosity of the emulsion and improves its film forming property on the roll whereby the drying efficiency is increased.

The granular product may be packaged and shipped or stored as a dry prepared powdered shortening composition. It may be incorporated in a prepared dry mix, including flour, sugar, salt and other ingredients ready for use in making bread and other baked products.

The buttermilk and soya bean milk contain lecithin as a natural ingredient, and this substance acts in substantially the same manner as the added emulsifying and solubility promoting agents and as described herein. The claims are intended to cover the emulsifying agent whether included as part of the natural product or included by addition.

With reference to the use of soya bean solids, e. g., from soya bean milk as the coating or hull for the fat granules, these solids contain the protein and phospholipoids such as lecithin in their natural or original intimate relation. Thus, the protein forms a protective surface or hull about the shortening fat and the phospholipoids are active to promote substantially instant rupture and solubility of the protein envelope to free the shortening fat and finely distribute the same in the baking operation. Soya bean flours from which the lecithin and protein have not been substantially reduced possess similar characteristics to the solids from soya bean milk and may be used for forming the hull for the fat granules because of the original or natural intimate relation of the soya bean protein and phospholipoids above described.

While we have described herein a roll dried shortening, the fat granules having a coating of soya bean solids may be prepared by spray drying in which case, the comminuted shortening will have substantially increased fat content, e. g. up to about 70 or 80 per cent and the milk solids will range from about 20 to 30 per cent. Such a composition may be prepared from the soya bean milk solids or from soya bean flour, as follows:

Example II 2,077 pounds of cool water are placed in a suitable vat. While agitating the cool water, sift in 338 pounds of soybean flour (51.0 lbs. fat, 260 lbs. soybean flour solids not fat). When the flour is properly dispersed and devoid of lumps, start beating and add 679 pounds of shortening fat. Heat to about 150° F. to 170° F. and hold for about twenty minutes, homogenize at about 2,000 pounds pressure or higher, and spray dry.

The dried granular product has the following analysis in parts by weight:

Total fat 73 parts:
    67.9 parts by weight fat
    33.8 parts by weight soybean flour
1.0 parts by weight moisture Bread prepared with the products of this invention by usual baking procedures and recipes can be identified or distinguished by improved grain and texture.

The term "shortening fat" in the claim is intended to include materials of the type described herein for accomplishing the shortening function.

This application is a continuation-in-part of our co-pending allowed application Serial Number 510,543, filed November 16, 1943.

Mixtures of soya bean solids may be employed for producing the protective hull or envelopes about the fat granules.

We claim:

A dry powdered shortening composition which is non-greasy, free-flowing and readily water dispersable composed of finely divided discrete particles of an edible fat, each of the particles being provided with a coating including soya bean solids containing protein and phospholipoids in their natural intimate relation, the protein forming a protective surface about the shortening fat and the phospholipoids being active to promote substantially instant rupture and solubility of the protein envelope to free the shortening fat and finely distribute the fat in the baking operation.

GERALD C. NORTH.
    ALVIN J. ALTON.
    LAWRENCE LITTLE.

REFERENCES CITED

The following references are of record in the file of this patent:

UNITED STATES PATENTS

| Number | Name | Date |
|---|---|---|
| 1,928,781 | Chapin | Oct. 3, 1933 |
| 2,052,028 | Harris et al. | Aug. 25, 1936 |
| 2,065,676 | Fechner | Dec. 29, 1936 |
| 2,132,417 | Harris | Oct. 11, 1938 |